P. SEAVER
Calipers.
No. 11,180.  Patented June 27, 1854.
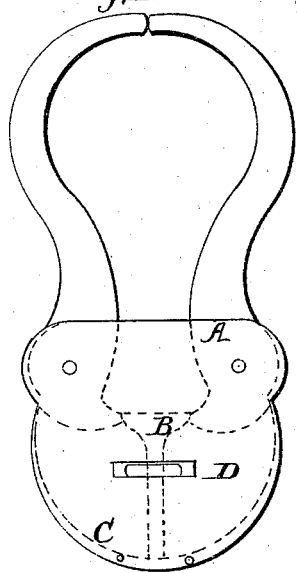
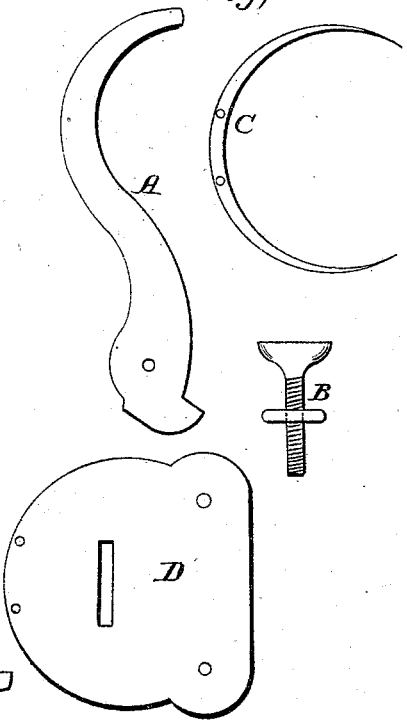
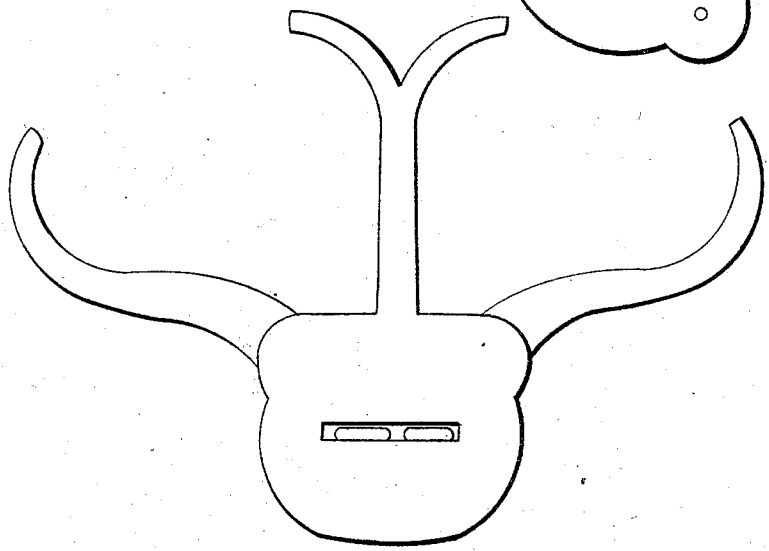

UNITED STATES PATENT OFFICE.

PEASLEY SEAVER, OF OXFORD, MASSACHUSETTS.

CALIPERS.

Specification of Letters Patent No. 11,180, dated June 27, 1854.

*To all whom it may concern:*

Be it known that I, PEASLEY SEAVER, of Oxford, in the county of Worcester and State of Massachusetts, have invented a new and Improved Method of Constructing Calipers; and I do hereby declare that the following is a full, clear, and exact description thereof, reference being had to the accompanying drawings and to letters of reference marked thereon.

The nature of my invention consists in making my calipers with a sliding cam or wedge to be operated by a nut and playing against cam or cams or projections on the sides or jaws to move them with facility and give firm support to the jaws at all times.

To enable others skilled in the art to make and use my invention I will proceed to describe the construction and operation of the same.

To construct my cam calipers I take two pieces of the form shown at (A), Fig. 2, also one like (B) with a thread and nut fitted to about half its length, also a piece in the form of (C), the ends of which are made thin to act as springs, these pieces A, B and C to be of about the same thickness and inclosed between two of the form of D with an aperture near the central part, through which the nut on B projects when put together as shown in Fig. 1.

The operation is this: The spring (C) presses the piece (A) against (B) so that when by screwing the nut the projections are (B) moved away from the nut they allow the pieces (A) to open by the action of said spring and when the projections are drawn toward the nut or between the pieces (A) they are closed or shut toward each other and at all times give a firm support to the pieces (A).

Fig. 3 is a modification of my invention and the form I purpose to use and agreeing with my model and containing nothing essentially different being merely two in one for the sake of convenience. The parts are lettered to correspond to the single one, that is pieces performing the same office in each are lettered the same, the precise form not being considered as part of my invention.

Having fully described my cam calipers, I do not claim the precise form, nor the operating by a screw or springs, or a combination of a screw and spring; but—

What I do claim as new and desire to secure by Letters Patent is—

I claim making the pieces (A) with the projections, when combined with cam (B) with its nut, and operating as herein described, or any other substantially the same.

In testimony whereof I have this 8th day of May set my hand, in presence of two witnesses.

PEASLEY SEAVER.

Attest:
 A. F. CLARK,
 JAS. G. ARNOLD.